US006131971A

United States Patent [19]

Chen

[11] Patent Number: 6,131,971

[45] Date of Patent: Oct. 17, 2000

[54] FOLDABLE SPADE

[76] Inventor: Kao-San Chen, No. 282, Sec. 2, Shu-Lin St., Tainan City, Taiwan

[21] Appl. No.: 09/360,362

[22] Filed: Jul. 23, 1999

[30] Foreign Application Priority Data

Aug. 21, 1998 [TW] Taiwan ................................ 87213791

[51] Int. Cl.[7] ........................................................ A01B 1/02

[52] U.S. Cl. ............................ 294/51; 294/53.5; 294/59; 403/93

[58] Field of Search .............................. 294/51, 53.5, 57, 294/59; 403/84, 93, 94, 103, 104; 7/114–116, 158, 163

[56] References Cited

U.S. PATENT DOCUMENTS

| | | | |
|---|---|---|---|
| 881,782 | 3/1908 | Elliott | 294/53.5 |
| 3,401,971 | 9/1968 | Cronquist | 294/53.5 |
| 3,993,340 | 11/1976 | Rusing et al. | 294/53.5 |
| 4,475,757 | 10/1984 | Glock | 294/53.5 |
| 4,700,420 | 10/1987 | Belanger | 294/51 |
| 4,727,609 | 3/1988 | Smith, Jr. | 7/158 |
| 5,063,628 | 11/1991 | Campbell | 294/51 |
| 5,102,079 | 4/1992 | Lee | 403/93 |

FOREIGN PATENT DOCUMENTS 75207272 11/1987 Taiwan .

*Primary Examiner*—Dean J. Kramer
*Attorney, Agent, or Firm*—Morgan & Finnegan LLP

[57] ABSTRACT

A foldable spade includes an elongated handle with front and rear end portions opposite to each other in a longitudinal direction, and a biasing member which is disposed proximate to the front end portion, and a blade member with a blade surface wall. A front engaging member is connected to a proximate end of the blade member, and is journalled on the front end portion of the handle about a pivot transverse to the longitudinal direction so as to be rotated between a first position, where the blade surface wall extends forward from the front engaging member along the longitudinal direction, and a second position, where the blade surface wall extends rearward from the front engaging member to be folded over the handle. A rear engaging member is disposed on the front end portion rearwardly of the front engaging member, and is biased by the biasing member to move along the longitudinal direction to engage the front engaging member when the front engaging member is in the first position. The rear engaging member is movable against the biasing member to release the front engaging member to move toward the second position so as to superimpose the blade member upon the handle.

6 Claims, 4 Drawing Sheets

1 11 113 114 112 111 115 116 14 13 12 15 2 21 211 22 212 23 4 42 422 423 421 411 52 31 321 312 313 32 3 311 30 41 40 50 5 51

FOLDABLE SPADE

BACKGROUND OF THE INVENTION

1. Field of the Invention

This invention relates to a spade, more particularly to a spade with a handle and a blade member foldable relative to the handle.

2. Description of the Related Art

A conventional spade generally includes a wooden handle and a metal blade member disposed on the handle for digging. However, the blade member is secured to the handle such that the length of the spade is fixed, thereby making the spade inconvenient to carry and store.

SUMMARY OF THE INVENTION

The object of the present invention is to provide a foldable spade with a blade member foldable relative to a handle to facilitate carrying and storage.

According to this invention, the foldable spade includes an elongated handle with front and rear end portions opposite to each other in a longitudinal direction, and a biasing member which is disposed proximate to the front end portion, and a blade member with a blade surface wall. A front engaging member is connected to a proximate end of the blade member, and is journalled on the front end portion of the handle about a pivot transverse to the longitudinal direction so as to be rotated between a first position where the blade surface wall extends forward from the front engaging member along the longitudinal direction, and a second position where the blade surface wall extends rearward from the front engaging member to be folded over the handle. A rear engaging member is disposed on the front end portion rearwardly of the front engaging member, and is biased by the biasing member to move along the longitudinal direction to engage the front engaging member when the front engaging member is in the first position. The rear engaging member is movable against the biasing member to release the front engaging member to move toward the second position so as to superimpose the blade member upon the handle.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 1:
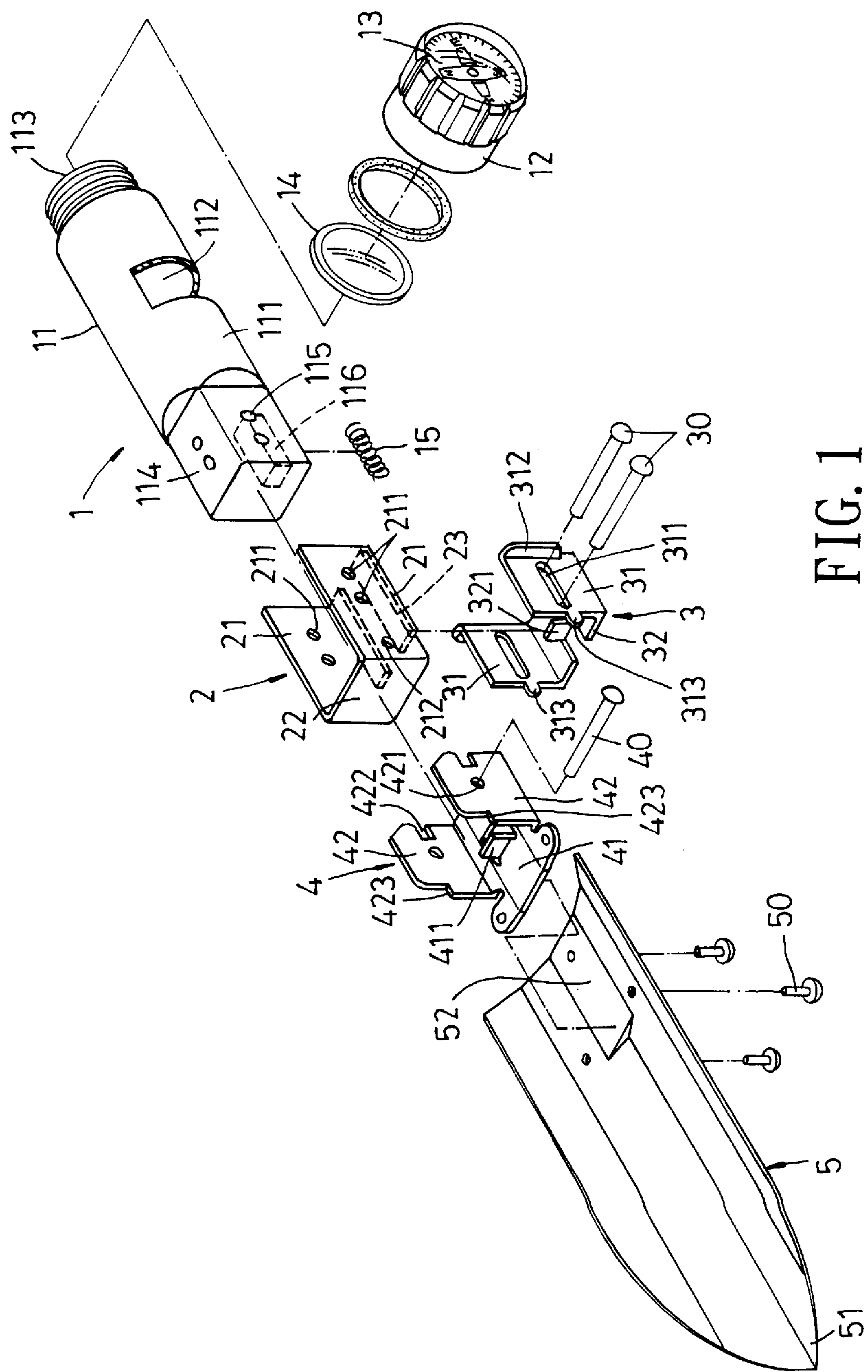
FIG. 1 is an exploded view of a preferred embodiment of a foldable spade according to this invention.
Figure 2:
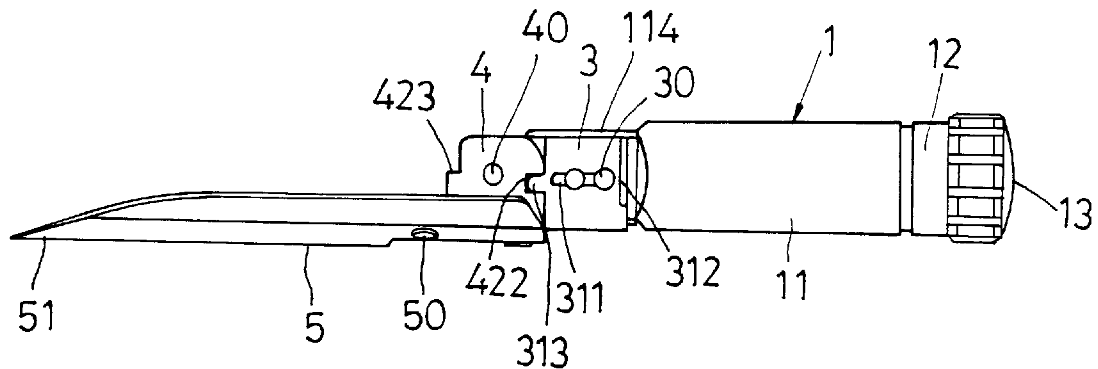
FIG. 2 is a side view of the preferred embodiment in a stretched operative state.

Referring to FIGS. 1 and 2, the preferred embodiment of the foldable spade according to the present invention is shown to comprise an elongated handle 1, a metal connecting member 2, a metal blade member 5, and metal front and rear engaging members 4,3.

The handle 1 includes a handle body 11 which is made of a plastic material. The handle body 11 includes a threaded rear end portion 113 for threadedly engaging a cap member 12 with a compass 13 and a lens 14 disposed thereon, a rectangular front end portion 114 which is disposed opposite to the rear end portion 113 in a longitudinal direction and which has two pairs of mounting holes 115 extending in a direction transverse to the longitudinal direction and a spring receiving chamber 116 for receiving a biasing member 15, such as a tension spring, and a handle portion 111 which is interposed between the front and rear end portions 114,113 and which has a receiving space 112.

The connecting member 2 is substantially U-shaped, and includes two parallel connecting plates 21 and a front plate 22 interposed therebetween so as to be connected on the front end portion 114. Each connecting plate 21 has two holes 211 to register with the mounting holes 115, and a pivot hole 212 formed forwardly of the front end portion 114. Two extending plates 23 extend inwardly from the connecting plates 21 to abut against the front end portion 114.

The blade member 5 has a blade surface wall with a distal end 51 and a proximate end 52 relative to the handle 1.

Figure 6:
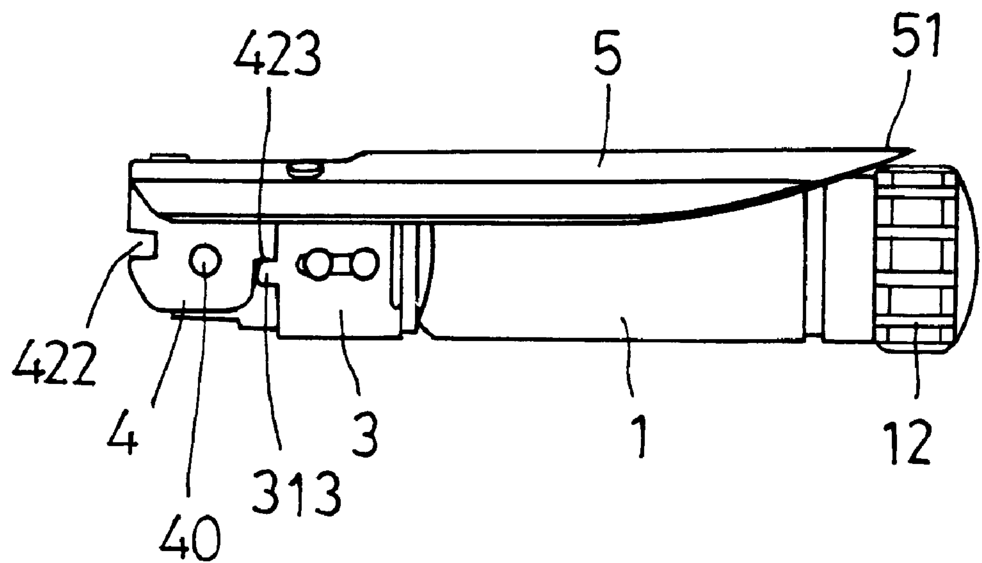
FIG. 6 is a view similar to FIG. 2, but in a folded state.

The front engaging member 4 includes a bottom plate 41 which is secured on the proximate end 52 of the blade member 5 by rivet fasteners 50, and a pair of first engaging plates 42 which extend upwardly from the bottom plate 41 and which have two pivot holes 421 opposite to each other in the transverse direction for passage of a pivot pin 40 through the pivot holes 421, 212. Thus, the front engaging member 4 is journalled on the connecting member 2 about the pivot pin 40 so as to be rotated between a first position where the blade surface wall extends forward from the front engaging member 4 along the longitudinal direction (as shown in FIG. 2), and a second position where the blade surface wall extends rearward from the front engaging member 4 to be folded over the handle 1 (as shown in FIG. 6). In addition, the front engaging member 4 further has a limiting member 411 which is disposed on the bottom plate 41 so as to abut against the front plate 22 and limit rearward movement of the front engaging member 4 and the blade member 5 when the front engaging member 4 is in the first position during use. Two first retaining notches 422 and two second retaining notches 423 are formed in the first engaging plates 42 at two opposite sides thereof in the longitudinal direction.

The rear engaging member 3 is substantially U-shaped, and includes a pair of second engaging plates 31 which have elongate slots 311 each extending in the longitudinal direction. Two engaging rods 30 pass through the elongate slots 311, and are secured in the mounting holes 115 and the holes 211 such that the rear engaging member 3 is movable relative to the front engaging member 4 along the elongate slots 311. Two operating portions 312 are disposed on and extend outwardly from the second engaging plates 31 for control of the movement of the rear engaging member 3. Two retaining protrusions 313 extend forward in the longitudinal direction from the second engaging plates 31 so as to engage the first retaining notches 422 when the front engaging member 4 is in the first position as shown in FIG. 2, or so as to engage the second retaining notches 423 when the front engaging member 4 is in the second position as shown in FIG. 6. In addition, the rear engaging member 3 further includes a base part 32 which bridges the second engaging plates 31, and an abutting portion 321 which is disposed on the base part 32. Thus, when the rear engaging member 3 is moved rearwardly away from the front engaging member 4, the tension spring 15 is compressed by the abutting portion 321.

Figure 3:
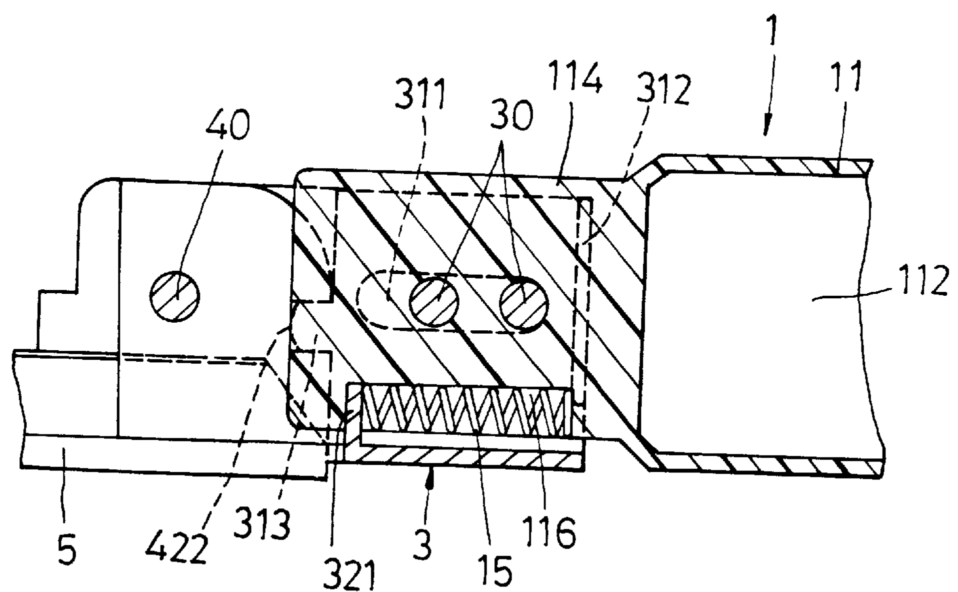
FIG. 3 is a partly sectional view of a portion of the foldable spade wherein front and rear engaging members are in a retained state.

As shown in FIGS. 1, 2 and 3, in the stretched operative state, the blade member 5 is retained parallel to the longitudinal direction by the engagement of the retaining protrusions 313 and the first retaining notches 422 and the biasing force of the tension spring 15 against the abutting portion 321. Moreover, the limiting member 411 abuts against the front plate 22 to prevent rearward movement of the front engaging member 4 and the blade member 5 during use.

Figure 4:
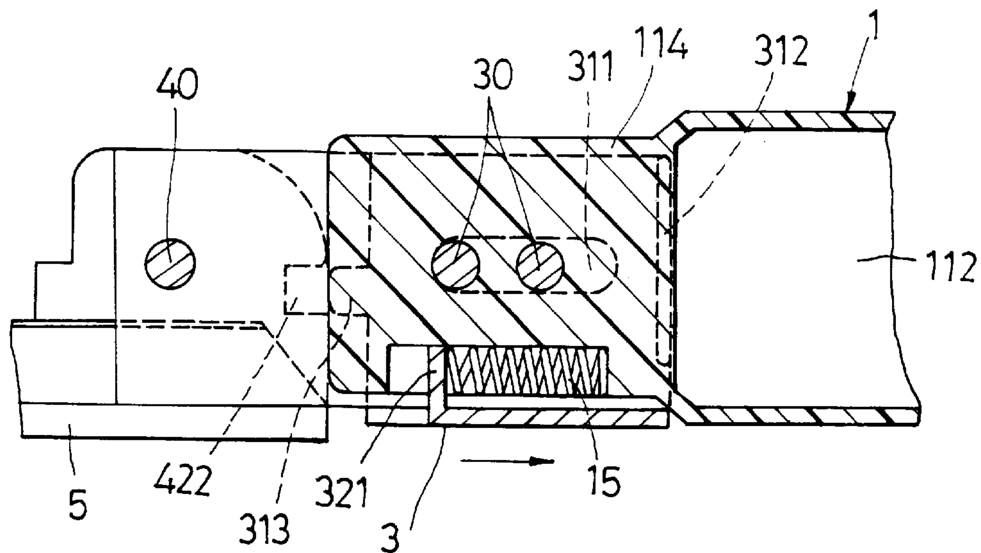
FIG. 4 is a view similar to FIG. 3, wherein the front and rear engaging members are in a released state.
Figure 5:
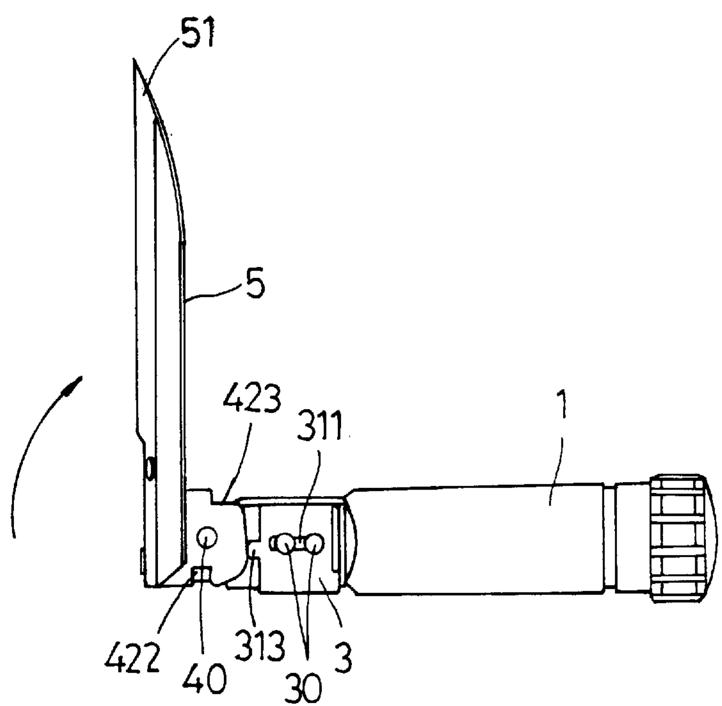
FIG. 5 is a view similar to FIG. 2, but in a folding state.

Referring to FIGS. 4 and 5, when it is desired to fold the blade member 5, the rear engaging member 3 is moved rearward to disengage the retaining protrusions 313 from the first retaining notches 422 so as to permit 180° turning of the front engaging member 4 along with the blade member 5 about the pivot pin 40 to superimpose the blade member 5 upon the handle 1, as shown in FIG. 6. At this time, the retaining protrusions 313 engage the second retaining notches 423 by the biasing force of the tension spring 15 for retaining the folded state of the blade member 5.

As illustrated, the spade of this invention has a foldable blade member 5 which reduces the length of the spade to facilitate carrying and storage. In addition, the compass 13 and the lens 14 may be received in the handle 11. Small objects, such as nails and screws, may be received in the receiving space 112, thereby resulting in added convenience when using the spade.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:

1. A foldable spade comprising:

an elongated handle with front and rear end portions opposite to each other in a longitudinal direction, and a biasing member disposed proximate to said front end portion;

a blade member having a blade surface wall with a distal end and a proximate end relative to said handle;

a front engaging member including a bottom plate secured on said proximate end of said blade member, and a pair of first engaging plates which extend from said bottom plate in a direction transverse to the longitudinal direction and a pivot transverse to the longitudinal direction and which are disposed pivotally on said front end portion of said handle about the pivot so as to be rotated between a first position where said blade surface wall extends forward from said front engaging member along the longitudinal direction, and a second position where said blade surface wall extends rearward from said front engaging member to be folded over said handle; and a rear engaging member substantially U-shaped, and including a pair of second engaging plates which are disposed on said front end portion of said handle rearwardly of said first engaging plates, and which have elongated slots that extend in the longitudinal direction, and an engaging rod which passes through said elongated slots and which is secured to said front end portion of said handle in a direction parallel to the pivot such that said engaging rod is movable relative to said rear engaging member along said elongated slots when said rear engaging member is move relative to said front engaging member in the longitudinal direction, said rear engaging member further having a base part which bridges said second engaging plates, and an abutting portion which is disposed on said base part, and biased by said biasing member to move along the longitudinal direction to engage said front engaging member when said front engaging member is in the first position, said rear engaging member being movable against said biasing member to release said front engaging member to move toward the second position.

2. The foldable spade as claimed in claim 1, wherein said front engaging member further includes a limiting member disposed on said bottom plate so as to abut against said front end portion of said handle and limit rearward movement of said front engaging member and said blade member when said front engaging member is in the first position.

3. The foldable spade as claimed in claim 1, wherein said rear engaging member has a retaining protrusion extending forward in the longitudinal direction, said front engaging member having a first retaining notch extending therein so as to engage said retaining protrusion when said front engaging member is in the first position.

4. The foldable spade as claimed in claim 3, wherein said front engaging member further has a second retaining notch disposed opposite to said first retaining notch along the longitudinal direction so as to engage said retaining protrusion when said front engaging member is rotated from the first position about 180° to superimpose said blade member upon said handle.

5. The foldable spade as claimed in claim 1, further comprising a compass disposed on said rear end portion of said handle.

6. The foldable spade as claimed in claim 5, wherein said handle has a receiving space formed in said rear end portion to receive said compass.

* * * * *